(12) United States Patent
Zhou et al.

(10) Patent No.: US 7,894,505 B2
(45) Date of Patent: Feb. 22, 2011

(54) APPARATUS AND METHOD FOR SELECTING EFFECTIVE CHANNEL IN A MULTI-USER MIMO SYSTEM

(75) Inventors: Yong-Xing Zhou, Yongin-si (KR); Sung-Jin Kim, Suwon-si (KR); JianJun Li, Yongin-si (KR); Ho-Jin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 947 days.

(21) Appl. No.: 11/785,743

(22) Filed: Apr. 19, 2007

(65) Prior Publication Data

US 2007/0253508 A1 Nov. 1, 2007

Related U.S. Application Data

(60) Provisional application No. 60/792,975, filed on Apr. 19, 2006.

(51) Int. Cl.
    *H04B 1/00* (2006.01)
(52) U.S. Cl. .......... 375/141; 375/146; 375/267; 375/341; 375/358; 370/282; 370/318; 370/465; 455/13.4; 455/24; 455/67.13; 455/226.1

(58) Field of Classification Search .......... 375/141, 375/146, 147, 267, 299, 341, 358, 219–222; 370/275, 282, 318–321, 329–330, 335, 336, 370/340, 342, 345, 436, 437, 441, 442, 465, 370/478–480, 491, 498; 455/13.4, 24, 500, 455/67.11, 67.13, 69, 561, 562.1, 101, 115.1, 455/127.1, 226.1–226.3
See application file for complete search history.

(56) References Cited

U.S. PATENT DOCUMENTS 6,859,503 B2 * 2/2005 Pautler et al. ........ 375/299

(Continued)

FOREIGN PATENT DOCUMENTS

KR    10-2002-0008301 A    1/2002

(Continued)

*Primary Examiner*—Dac V Ha
(74) *Attorney, Agent, or Firm*—NSIP Law

(57) ABSTRACT

An apparatus and method for selecting an effective channel in a multi-user MIMO system are provided, in which a receiver receives pilot signals from a transmitter, determines channel information indicating an antenna offering the best quality among a plurality of antennas using the pilot signals, and generates feedback information with the channel information, and the transmitter receives feedback information from a plurality of receivers, generates a channel matrix using the feedback information, and transmits data simultaneously to the plurality of receivers using the channel matrix.

27 Claims, 6 Drawing Sheets

U.S. PATENT DOCUMENTS

| | | | |
|---|---|---|---|
| 7,197,084 B2 * | 3/2007 | Ketchum et al. | 375/296 |
| 7,471,963 B2 * | 12/2008 | Kim et al. | 455/562.1 |
| 2005/0192019 A1 * | 9/2005 | Kim et al. | 455/452.1 |
| 2006/0120478 A1 * | 6/2006 | Kim et al. | 375/267 |
| 2006/0203708 A1 * | 9/2006 | Sampath et al. | 370/208 |
| 2007/0092019 A1 * | 4/2007 | Kotecha et al. | 375/267 |
| 2007/0147536 A1 * | 6/2007 | Melzer et al. | 375/267 |
| 2008/0043677 A1 * | 2/2008 | Kim et al. | 370/332 |
| 2008/0056414 A1 * | 3/2008 | Kim et al. | 375/347 |
| 2008/0075196 A1 * | 3/2008 | Kim et al. | 375/299 |
| 2008/0108310 A1 * | 5/2008 | Tong et al. | 455/69 |
| 2008/0125051 A1 * | 5/2008 | Kim et al. | 455/67.13 |
| 2009/0061786 A1 * | 3/2009 | Malik et al. | 455/69 |

FOREIGN PATENT DOCUMENTS

| | | |
|---|---|---|
| KR | 10-2005-0055592 A | 6/2005 |
| KR | 10-2006-0054155 | 5/2006 |
| KR | 10-2006-0068082 | 6/2006 |

* cited by examiner

APPARATUS AND METHOD FOR SELECTING EFFECTIVE CHANNEL IN A MULTI-USER MIMO SYSTEM

CROSS-REFERENCE TO RELATED PATENT APPLICATION

This application claims the benefit under 35 U.S.C. §119(e) of U.S. Provisional Patent Application No. 60/792,975, filed on Apr. 19, 2006, in the U.S. Patent and Trademark Office, the entire disclosure of which is hereby incorporated by reference.

BACKGROUND OF THE INVENTION

1. Field of the Invention

The present invention generally relates to multi-user Multiple Input Multiple Output (MIMO) system. More particularly, the present invention relates to an apparatus and method for effectively selecting the best channels for a plurality of receivers based on effective channel information received from the receivers and sending data simultaneously on the best channels to the receivers in a multi-user MIMO system.

2. Description of the Related Art

In a system beyond the 3rd Generation (3G) system, for example, the 4th Generation (4G) system, both a wireless network and a Core Network (CN) are characterized by ubiquitous and seamless connection, high data rate, openness, and network convergence. The 4G system is designed to be capable of transmitting a large amount of data, aiming at high data rate.

The 4G system will be configured in an integrated form rather than in the form of a single network. That is, satellite networks, Wireless Local Area Network (WLAN), Digital Audio Broadcast (DAB), Digital Video Broadcast (DVB), and other networks will all be merged into the 4G system. Owing to the network integration, data or signals can be sent and received between a transmitter (for example, Base Station (BS)) and a plurality of receivers (for example, Mobile Stations (MSs)) by MIMO. To realize the MIMO technology, the transmitter can be equipped with N transmit antennas and the receivers can also have N receive antennas. As a consequence, data rate can be increased.

Concurrent provisioning of a service to multiple users causes multi-user interference, which can be cancelled by Dirty Paper Coding (DPC). Among DPC techniques, a low-complexity, high-performance Tomlinson-Harashima Precoding (THP) may be used.

A shortcoming of THP is huge feedback information. Since a plurality of receivers send feedback information about individual transmit antennas to a transmitter, the load on the transmitter is increased and overall system performance may be degraded.

Accordingly, there is a need for an apparatus and method for selecting channel in a multi-user MIMO system that can reduce feedback information between receivers and transmitters to reduce the load on the transmitter and avoid degrading overall system performance.

SUMMARY OF THE INVENTION

An aspect of the present invention is to address at least these problems and/or disadvantages and to provide at least the advantages described below. Accordingly, an aspect of the present invention is to provide a multi-user MIMO system for reducing total feedback information by allowing each receiver to send minimal effective channel information to a transmitter.

Another aspect of the present invention provides an apparatus and method of a receiver for detecting channel information using pilot signals received from a transmitter and sending effective channel information regarding the best channel state to the transmitter in a multi-user MIMO system.

A further aspect of the present invention provides an apparatus and method of a transmitter for selecting channel information for a plurality of receivers based on channel information received from the receivers in a multi-user MIMO system.

A further aspect of exemplary embodiments of the present invention provides an apparatus and method for a computer-readable recording medium for transmitting data simultaneously to a plurality of receivers by using feedback information received from the plurality of receivers, when the receiver detects channel information using the received pilot signal, generates feedback information with the detected channel information and then transmits the feedback information to the transmitter.

A further aspect of exemplary embodiments of the present invention provides an apparatus and method for a computer-readable recording medium for determining channel information and storing a channel information extracting program for transmitting the determined channel information to the transmitter, when the transmitter receives unique signal through the plurality of antennas.

A further aspect of exemplary embodiments of the present invention provides an apparatus and method for a computer-readable recording medium for storing a channel selection program for extracting, upon receipt of channel information from a plurality of receivers, filter information, controlling the power of data using the filter information, and controlling beamforming for a plurality of antennas using the filter information in order to simultaneously transmit the power-controlled data.

In accordance with an aspect of the present invention, there is provided a multi-user MIMO system, in which a receiver receives pilot signals from a transmitter, determines channel information indicating an antenna among a plurality of antennas using the pilot signals, and generates feedback information with the channel information, and the transmitter receives feedback information from a plurality of receivers, generates a channel matrix using the feedback information, and transmits data simultaneously to the plurality of receivers using the channel matrix.

In accordance with another aspect of the present invention, there is provided a channel selection method in a multi-user MIMO system, in which each of a plurality of receivers receives pilot signals through a plurality of antennas from a transmitter, measures the best quality with respect to the plurality of antennas using the pilot signals, and sends feedback information with channel information indicating the channel information measurement to the transmitter, and the transmitter receives the feedback information from the plurality of receivers, generates a channel matrix using the feedback information by the transmitter, and transmits data simultaneously to the plurality of receivers using the channel matrix.

In accordance with a further aspect of the present invention, there is provided a method of a receiver for extracting channel information in a multi-user MIMO system, in which the receiver receives different signals through a plurality of antennas, determines channel information indicating the best quality using the received signals, and sends the channel information to a transmitter.

In accordance with still another aspect of the present invention, there is provided a method of a transmitter for selecting a channel in a multi-user MIMO system, in which upon receipt of channel information from a plurality of receivers, the transmitter extracts filter information from the channel information, controls the power of data using the filter information, and controls beamforming for a plurality of antennas using the filter information in order to simultaneously transmit the power-controlled data to the plurality of receivers.

Other aspect, advantages and salient features of the invention will become apparent to those skilled in the art from the following detailed description, which, taken in conjunction with annexed drawings, discloses the invention.

BRIEF DESCRIPTION OF THE DRAWINGS

The above and other aspects, features and advantages of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters exemplified in the following description are provided to assist in a comprehensive understanding of the invention. Those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention are intended to provide a multi-user MIMO system. They are also intended to provide an apparatus and method for selecting an effective channel in a multi-user MIMO system.

Figure 1:
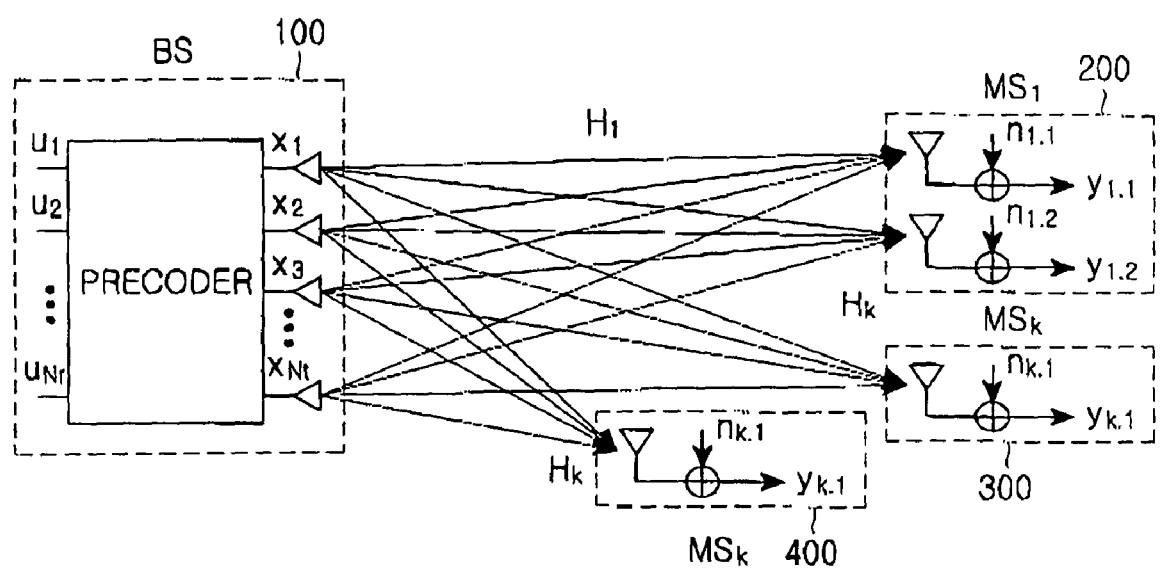
FIG. 1 illustrates the configuration of a multi-user MIMO system according to an exemplary embodiment of the present invention.

FIG. 1 illustrates the configuration of a multi-user MIMO system according to an exemplary embodiment of the present invention.

Referring to FIG. 1, the multi-user MIMO system can include a transmitter (for example, a BS) 100 and a plurality of receivers (for example, MSs) 200, 300 and 400.

According to an exemplary embodiment, the transmitter 100 precodes a plurality of input user data $u_1, u_2, \ldots, u_{Nt}$ through a precoder and broadcasts the precoded data $x_1, x_2, \ldots, x_{Nt}$ to the receivers 200, 300 and 400 through a plurality of transmit antennas. A receiver $MS_k$ receives the broadcast data through a plurality of receive antennas. The total number of receive antennas that the receivers have in the system is calculated by $$Nr = \sum_{k=1}^{K} Nr_k \leq Nt \qquad (1)$$

where Nr denotes the total number of receive antennas that the receivers have in the system, $Nr_k$ denotes the number of receive antennas in the receiver $MS_k$, and Nt denotes the number of the transmit antennas in the transmitter.

The transmitter sends the precoded signal $x_i$ (i=1, ..., Nt) to the receivers through the Nt transmit antennas. The received signal at the receiver $MS_k$ is expressed as $$y_k = H_k x + n_k \qquad (2)$$

where x is $[x_1, x_2, \ldots, x_{Nt}]^T$ ($[\cdot]^T$ represents transposition), $H_k$ denotes an $Nr_k \times N_t$ channel matrix, and $n_k$ denotes additive Gaussian random noise for the receiver $MS_k$.

According to equation (2), the received signal of all the receivers is given by $$y = Hx + n \qquad (3)$$

where $H=[H_1^T, H_2^T, \ldots, H_K^T]^T$, $y=[y_1^T, y_2^T, \ldots, y_K^T]^T$, and $n=[n_1^T, n_2^T, \ldots, n_K^T]^T$.

In the transmitter 100, the precoder reorders the input signal vector u by a permutation matrix P. The permutation matrix P specifies the ordering of THP, given as $$yy_k = UU_k^H \cdot (H_k x + n_k) = \Sigma VV_k^H x + UU_k^H \cdot n_k \qquad (4)$$

The channel states between the transmit antennas of the transmitter and the receive antennas of each receiver can be represented as a Hermitian matrix and multi-user MIMO can be realized using these antennas.

Also, in Equation 4, $$\sum_k W_k^H$$

and $UU_k^H$ are channel information measured through pilot signal transmitted by the transmitter. The receiver extracts channel information of a channel through the pilot signal, decomposes the extracted channel matrix using a method such as a Singular Value Decomposition(SVD), and extracts V and U from the decomposed matrix. The receiver singular-value-decomposes the extracted V and U.

In the multi-user MIMO system, the transmitter broadcasts pilot signals periodically to the receivers.

All the receivers measures the qualities (for example, Signal-to-Noise Ratios (SNRs), data rates, and so forth) or capacities of radio channels between the transmit antennas and the receive antennas using the pilot signals. They can then determine effective channel information using measurements and feed back the effective channel information to the transmitter. This effective channel information is measured by the receivers. That is, each receiver measures the channel qualities between the transmit antennas and its receive antennas using different pilot signals received from the transmit antennas of the transmitter and selects an antenna offering the best channel quality in terms of Signal-to-Interference Noise Ratio (SINR), capacity, throughput, and data rate. The receiver then feeds back information about the selected antenna to the transmitter.

Thus, the transmitter 100 receives effective channel information from the receivers 200, 300 and 400 and calculates backward filter information, forward filter information and scaling factors for the receivers 200, 300 and 400. The backward filter information, the forward filter information, and the scaling factors can be calculated on a receiver-by-receiver basis. The transmitter controls the power of transmission data and controls beamforming using the backward filter information, the forward filter information, and the scaling factors, for simultaneous data transmission to the receiver 200, 300 and 400. Alternatively, the transmitter 100 generates a channel matrix using the backward filter information, the forward filter information and the scaling factors and sends data simultaneously to the receivers 200, 300 and 400 based on the channel matrix. Also, the transmitter 100 signals the scaling factors to the receivers 200, 300 and 400.

Figure 2:
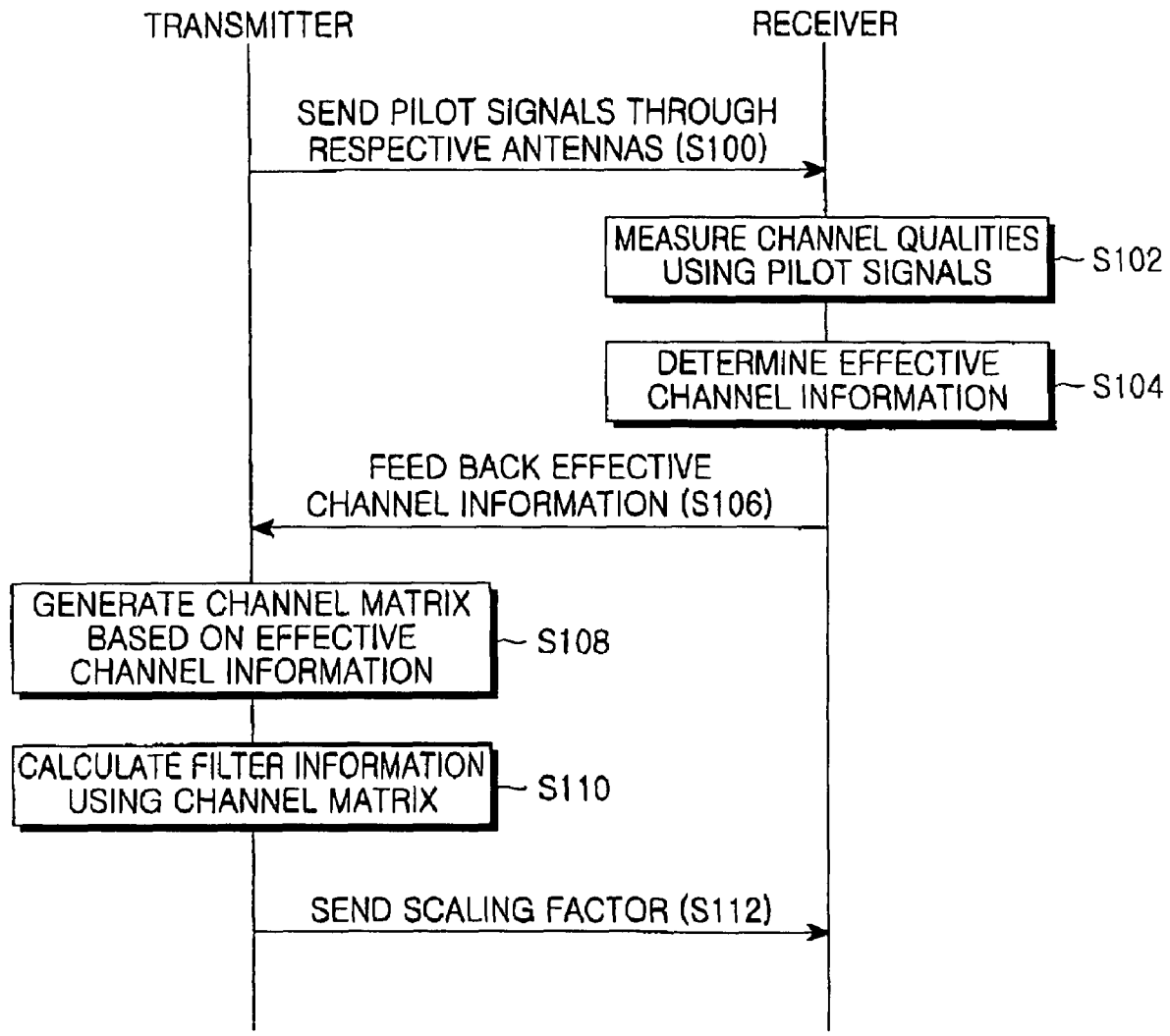
FIG. 2 is a flowchart illustrating a method for selecting the best channel for a receiver in the multi-user MIMO system according to an exemplary embodiment of the present invention.

FIG. 2 is a flowchart illustrating a method for selecting the best channel for a receiver in the multi-user MIMO system according to an exemplary embodiment of the present invention.

Referring to FIG. 2, the transmitter sends pilot signals periodically through the respective transmit antennas in steps S100. Hence, a receiver with a plurality of antennas can receive the pilot signals that may be different from one another.

Upon receipt of the pilot signals, the receiver measures the qualities or capacities of a downlink channel in step S102. The quality measurements include SINRs, data rates, or capacities. In step S104, the receiver determines effective channel information from the channel quality measurements. The effective channel information is described as information indicating the channel state of a receive antenna offering the best channel quality or capacity among the receive antennas of the receiver. From the perspective of the receiver, the effective channel information is information about the best channel state in which data can be received and can be expressed as a Hermitian matrix.

The receiver sends feedback information with the effective channel information to the transmitter in step S106. The feedback information contains channel information between the individual antennas of the receiver and transmit antennas that offer good channel qualities for the receive antennas, the channel qualities, an effective channel quality value, and, if the antennas are grouped, the indexes of the grouped antennas.

In step S108, the transmitter generates a channel matrix based on effective channel information received from a plurality of receivers. The channel matrix represents channel information between the antennas of the transmitter and the antennas of the receivers. The transmitter calculates filter information based on the channel matrix in step S110. The filter information includes backward filter information, forward filter information and scaling factors for the receivers. The backward filter information is used to control the power of transmission data and the forward filter information is used for antenna beamforming or antenna grouping. The scaling factors are the modulo levels of modulo operations and sent to the receivers. The receivers use the inverses of the modulo levels.

The transmitter generates an effective composite channel matrix or parameter. The effective composite channel matrix or parameter is a matrix with entries indicating the best channel qualities between the transmit antennas and the receive antennas. The transmitter provides a MIMO service simultaneously to the receivers using this optimal matrix. In step S112, the transmitter sends the scaling factors to the receivers.

Figure 3:
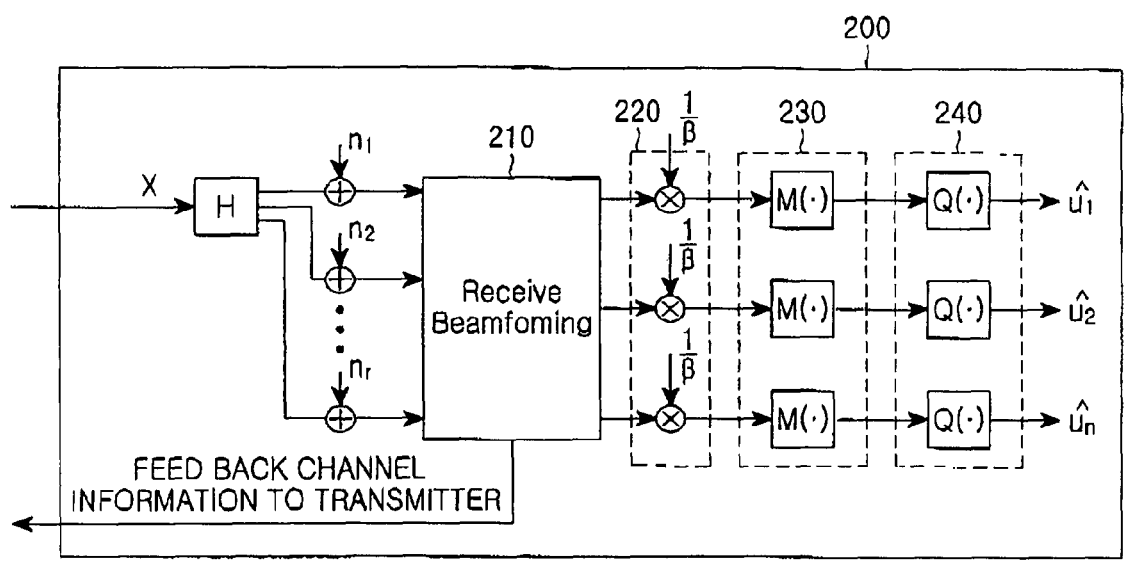
FIG. 3 is a block diagram of a channel information extractor of a receiver in the multi-user MIMO system according to an exemplary embodiment of the present invention.

FIG. 3 is a block diagram of a channel information extractor of the receiver in the multi-user MIMO system according to an exemplary embodiment of the present invention.

Referring to FIG. 3, the channel information extractor of the receiver includes a receive beamformer 210 for measuring channel qualities using pilot signals received from the transmit antennas of the transmitter, a multiplier 220 for multiplying an input signal by the inverse of a scaling factor received from the transmitter, a modulo operator 230 for preventing a power increase in the output signal of the multiplier 220, and a quantizer 240 for quantizing the output signal of the modulo operator 230.

The multiplier 220, the modulo operator 230, and the quantizer 240 are allocated for each antenna. That is, these devices are provided in a one-to-one correspondence to the antennas of the receiver.

The multiplier 220 multiplies an input signal by the inverse $1/\beta$ of the received scaling factor $\beta$ representing the modulo level of the transmitter.

As illustrated in FIG. 3, the receiver is provided with a plurality of antennas, each receiving pilot signals from the transmitter. The receive beamformer 210 measures the channel qualities of the pilot signals received through each antennas.

The channel qualities, which can be expressed as an effective Hermitian matrix, include SINRs and data rates. Then the receive beamformer 210 determines effective channel information from the channel quality measurements. The effective channel information is calculated by $$yy_k = UU_k^H \cdot (H_k x + n_k) = \sum VV_k^H x + UU_k^H \cdot n_k \quad (5)$$

where $$H_k = UU_k \cdot \sum_k \cdot VV_k^H,$$

$$UU_k \cdot UU_k^H = I_{Nr_k},$$

$$VV \cdot VV_k^H = I_{Nt}, \text{ and } \sum_k \text{ is a}$$

diagonal matrix. $UU_k^H$ is known to the receiver. That is, the transmitter periodically signals system parameters and transmitter-specific information to all receivers. These receivers measure channel qualities each time they receive the signal or when necessary for system management. That is, the receiver performs a preliminary operation on the signal received from the transmitter to determine the effective channel information, for example, to calculate $H_{eff}$ and $n_{eff}$ by Singular Value Decomposition (SVD).

After the receive beamforming, the received signal of all the receivers is calculated by $$yy = H_{eff} x + n_{eff} \quad (6)$$

where $H_{eff} = [H_{eff,1}^T, H_{eff,2}^T, \ldots, H_{eff,K}^T]^T$, $yy = [yy_1^T, yy_2^T, \ldots, yy_K^T]^T$, and $n_{eff} = [n_{eff,1}^T, n_{eff,2}^T, \ldots, n_{eff,K}^T]^T$.

When the receiver determines the effective channel information (for example, $H_{eff}$ and $n_{eff}$) in step S104 of FIG. 2, it sends the feedback information with the effective channel information to the transmitter in step S106.

Figure 4:
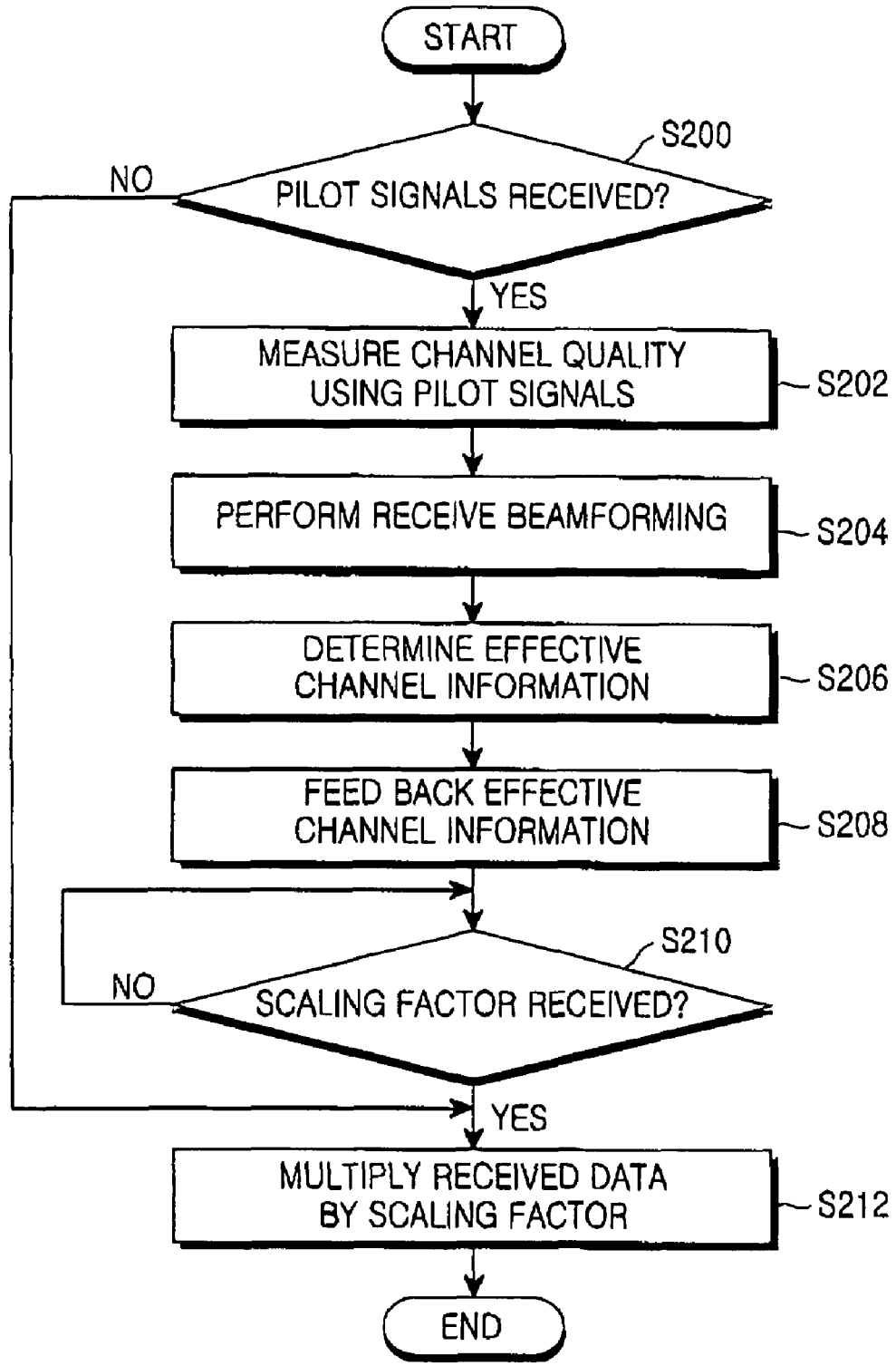
FIG. 4 is a flowchart illustrating a channel information extracting method of the receiver in the multi-user MIMO system according to an exemplary embodiment of the present invention.

FIG. 4 is a flowchart illustrating a channel information extracting method of the receiver in the multi-user MIMO system according to an exemplary embodiment of the present invention.

Referring to FIG. 4, upon receipt of pilot signals at each antenna from the transmitter in step S200, the receiver measures channel qualities using the pilot signals on an antenna basis in step S202. The channel quality measurements include SINRs, data rates, and Channel Quality Information (CQI). In step S204, the receiver performs receive beamforming by multiplying a left unitary matrix obtained by SVD. The SVD is an algorithm used to form a plurality of spatial subchannels and achieve spatial multiplexing using a plurality of transmit and receive antennas. The use of the SVD enables separation of the spatial subchannels and provides spatial multiple channels.

After steps S202 and S204, the receiver determines effective channel information ($H_{eff}$ and $n_{eff}$) by equation (5) expressing the received signal after the receive beamforming in step S206. In equation (5), $$\sum_k VV_k^H$$

corresponds to $H_{eff}$ and $UU_k^H$ corresponds to $n_{eff}$. Equation (5) can be expressed as equation (6). The receiver sends the effective channel information to the transmitter in step S208. All receivers having connections in the form of Hermitian matrices to the transmitter perform the same algorithm of steps S200 to S208.

Upon receipt of a scaling factor from the transmitter in step S210, the receiver multiplies received data or a received signal by the scaling factor in step S212. The scaling factor is used to suppress signal power.

Figure 5:
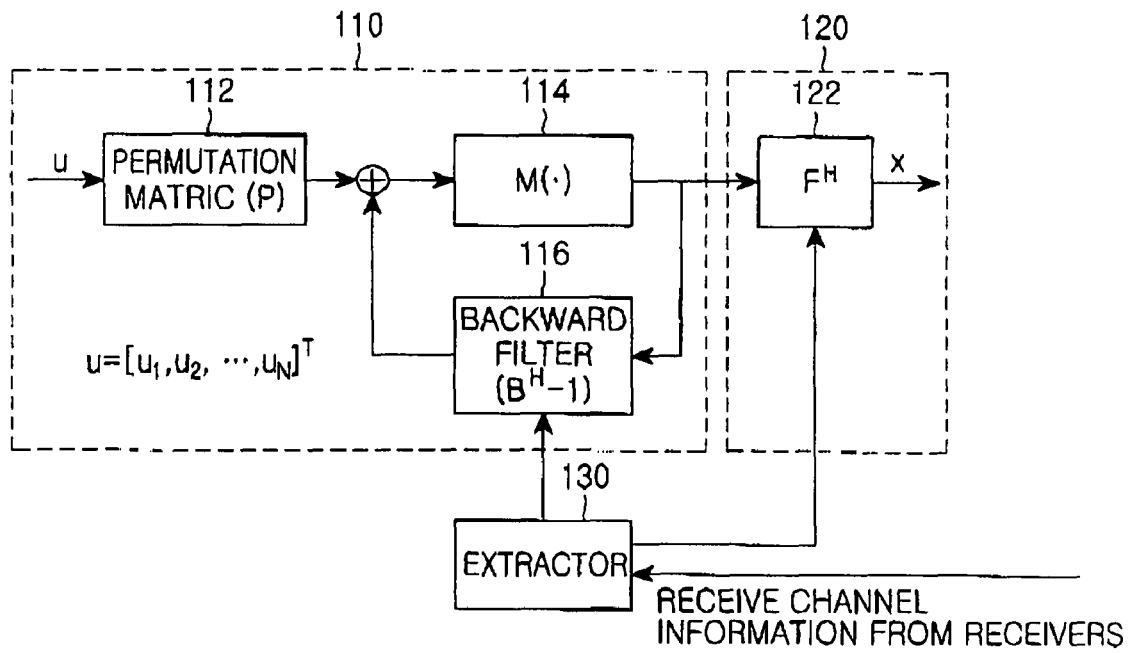
FIG. 5 is a block diagram of a channel selector of a transmitter in the multi-user MIMO system according to an exemplary embodiment of the present invention.

FIG. 5 is a block diagram of a channel selector of a transmitter in the multi-user MIMO system according to an exemplary embodiment of the present invention.

Referring to FIG. 5, a transmitter 100 includes a THP part 110, a beamforming part 120, and an extractor 130.

The extractor 130 receives feedback information including effective channel information from a plurality of receivers and generates a channel matrix using the received effective channel information. Then, the extractor 130 calculates filter information channel by channel or antenna by antenna in the channel matrix. The filter information contains backward filter information $B^H$, forward filter information $F^H$, and a scaling factor β. The extractor 130 generates a matrix using the filter information or sends the filter information to a backward filter 116 of the THP part 110 and a forward filter 122 of the beamforming part 120.

The THP part 110 includes a permutation matrix portion 112 having a permutation matrix P representing the ordering of an input signal vector u, the backward filter 116 for filtering the ordered signal vector u by $B^H$ and a modulo operator 114 for reducing signal power increased by $B^H$. The backward filter 116 receives $B^H$ for each channel from the extractor 130 and increases the power of data by $B^H$. The forward filter 122 receives $F^H$ from the extractor 130 and sends data to one or more receivers by antenna beamforming or antenna grouping using $F^H$.

That is, the beamforming part 120 performs beamforming filtering on the output signal v of the THP part 110 to obtain a transmission signal vector x. The forward filter 122 acts a beamforming filter. There are two constrains on precoding filters. One is to limit the total transmit power and the other is imposed on the backward filter information $B^H$ that must be strictly triangular. The triangular structure ensures the causality of the feedback process.

In operation, the extractor 130 receives effective channel information (for example, $H_{eff}$ and $n_{eff}$) for each antenna from a plurality of receivers and generates a channel matrix based on the effective channel information. The channel matrix represents antennas offering good channel quality between the antennas of the transmitter and those of the receivers. The extractor 130 then calculates filter information for each receiver. The filter information contains backward filter information $B_{block}^H$, forward filter information $F_{block}^H$, and a scaling factor $\beta_{block}^H$. Here, $B_{block}^H = L_{block}$ and $F_{block}^H = \beta_{block}^H H_{eff}^H P_{block}^T L_{block}^{-H} D_{block}^{-1}$. $\beta_{block}^H$ can be calculated to satisfy transmit power. $L_{block}$ is a unit lower triangular matrix and $D_{block}$ is a diagonal matrix, both being calculated by $$P_{block} \cdot \Phi_{block} \cdot P_{block}^T = L_{block} D_{block} L_{block}^H \quad (7)$$

where $\Phi_{block} = H_{eff} H_{eff}^H + \gamma^{-1} I$ and $\gamma = Es/trace(\phi_{n_{eff} n_{eff}}) = Es/trace(\phi_{nn})$.

In this way, the extractor 130 calculates the filter information and provides the backward filter information to the backward filter 116 and the forward filter information to the forward filter 122. Thus, the transmitter can set up channels to carry data simultaneously to the plurality of receivers or performing beamforming for the transmit antennas.

The power of user data input to the permutation matrix portion 112 is increased by the backward filter and sent simultaneously to the receivers on the channels by the forward filter.

Figure 6:
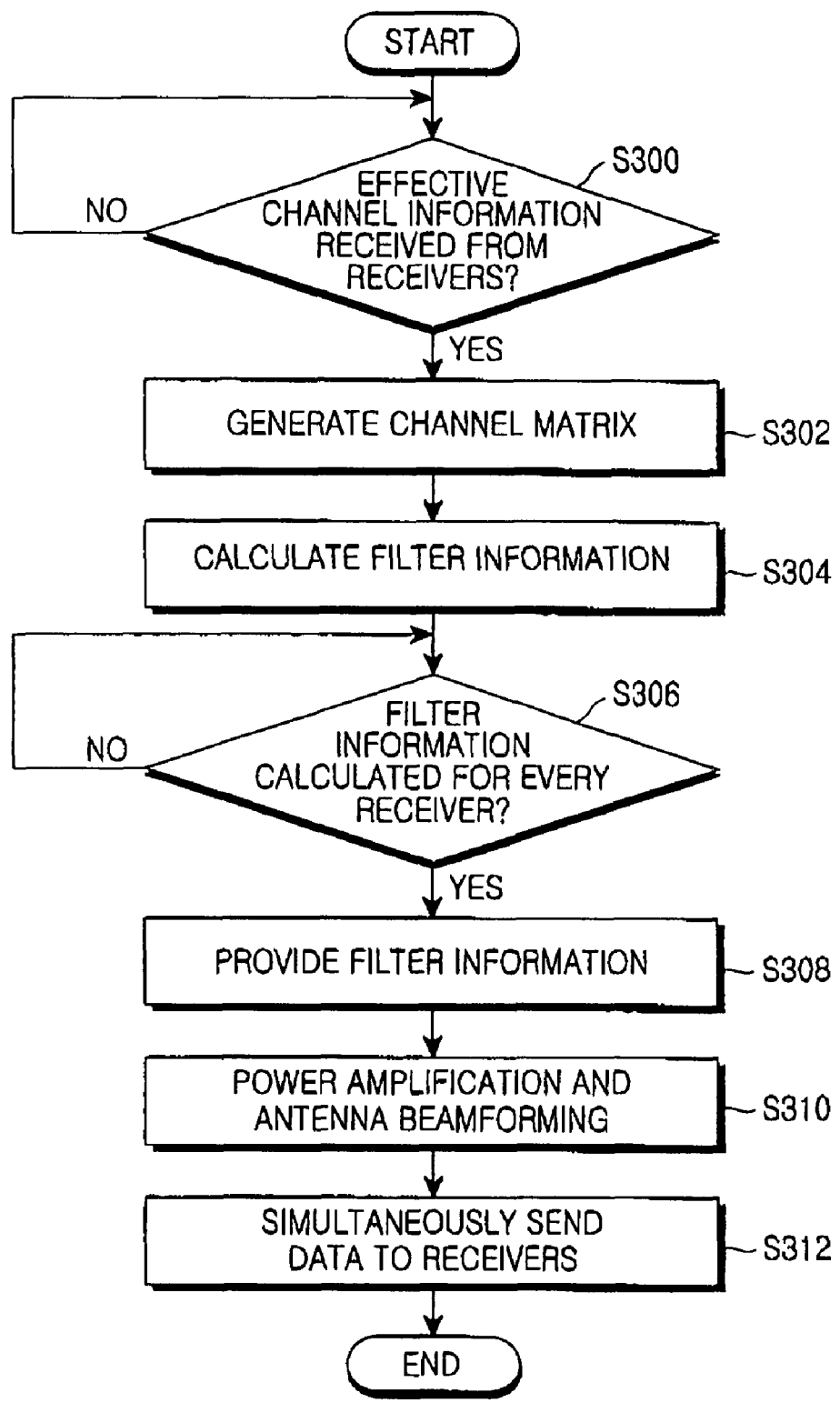
FIG. 6 is a flowchart illustrating a channel selection method of the transmitter in the multi-user MIMO system according to an exemplary embodiment of the present invention.

FIG. 6 is a flowchart illustrating a channel selection method of the transmitter in the multi-user MIMO system according to an exemplary embodiment of the present invention.

Referring to FIG. 6, upon receipt of effective channel information from a plurality of receivers in step S300, the transmitter generates a channel matrix using the effective channel information in step S302. The effective channel information of each receiver represents information about a particular antenna that offers good channel quality among the antennas of the receiver. The good channel quality that the particular antenna offers from the perspective of the receiver may not be good enough to the transmitter. That is, even though the receiver wants to receive data on the particular channel from the transmitter, the transmitter may send the data on a different channel or may send no data to the receiver. Hence, the channel matrix represents antennas with good channel quality between the transmitter and the antennas of the receivers. In step S304, the transmitter calculates filter information using the channel matrix. The filter information includes backward filter information, forward filter information and a scaling factor. The backward filter information is a reference value for controlling the signal power of data. That is, the transmitter controls the power of transmission data using this reference value. The forward filter information is a reference value for antenna beamforming. That is, the transmitter determines an antenna group or wirelessly connects a particular transmit antenna to a particular receiver using the forward filter information in order to provide a MIMO service.

The filter information calculation of step S304 is performed for every receiver that has sent effective channel information. When completing calculating the filter information for each receiver, the transmitter applies the backward filter information to the backward filter and the forward filter information to the forward filter in step S308. In step S310, the transmitter amplifies the power of input user data by the backward filter information and performs antenna beamforming by the forward filter information. The transmitter sends the user data input to the permutation matrix portion 112 to the plurality of receivers in step S312.

In accordance with the present invention as described above, each of a plurality of receivers can determine effective channel information indicating an optimal antenna using pilot signals received through a plurality of receive antennas. A transmitter can receive the effective channel information from the receivers and determines the best channels for the receivers within its service area. Therefore, the amount of feedback information can be decreased, thereby increasing system performance.

The above-described exemplary embodiments of an apparatus and method for selecting channel in a multi-user MIMO system may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and so on, including a carrier wave transmitting signals specifying the program instructions, data structures, and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

While the invention has been shown and described with reference to the present invention thereof, it will be understood by those skilled in the art that various changes in form and details may be made therein without departing from the spirit and scope of the present invention as defined by the appended claims and their equivalents.

What is claimed is:

1. A multi-user Multiple-Input Multiple-Output (MIMO) system, comprising:
   a receiver configured to:
      receive pilot signals through each of antennas from a transmitter;
      select an antenna having a best channel quality among the antennas using the pilot signals; and
      generate feedback information comprising channel information on the selected antenna; and
   the transmitter configured to:
      receive the feedback information from each of a plurality of receivers;
      generate a channel matrix using the feedback information; and
      transmit data simultaneously to the plurality of receivers using the channel matrix,
   wherein the feedback information comprises a Hermitian matrix comprising channel information $$\sum_k VV_k^H$$

and channel noise $UU_k^H$, and
   wherein each of V and U is a matrix obtained by SVD of a channel matrix H, $^H$ is a Hermitian operator, and k is an integer.

2. A multi-user Multiple-Input Multiple-Output (MIMO) system, comprising:
   a receiver configured to:
      receive pilot signals through each of antennas from a transmitter;
      select an antenna having a best channel quality among the antennas using the pilot signals; and
      generate feedback information comprising channel information on the selected antenna; and
   the transmitter configured to:
      receive the feedback information from each of a plurality of receivers;
      generate a channel matrix using the feedback information; and
   transmit data simultaneously to the plurality of receivers using the channel matrix,
   wherein the transmitter is further configured to calculate backward filter information $B_{block}^H$, forward filter information $F_{block}^H$, and a scaling factor $\beta_{block}^H$ for each of the receivers using the channel information received from each receiver, and
   wherein $^H$ is a Hermitian operator.

3. The multi-user MIMO system of claim 2, wherein the transmitter is further configured to send the scaling factor to each receiver.

4. The multi-user MIMO system of claim 2, wherein:
   the backward filter information $B_{block}^H$ comprises a unit lower triangular matrix; and
   the transmitter is further configured to control the power of transmission data using the backward filter information $B_{block}^H$.

5. The multi-user MIMO system of claim 2, wherein:
   the transmitter is further configured to calculate the forward filter information $F_{block}^H$ by $F_{block}^H = \beta_{block}^H H_{eff}^H P_{block} T L_{block}^{-H} D_{block}^{-1}$ in which $D_{block}$ is a diagonal matrix; and
   the transmitter is further configured to calculate the scaling factor $\beta_{block}^H$ for each receiver to satisfy a transmit power,
   wherein H is a channel matrix.

6. The multi-user MIMO system of claim 2, wherein the scaling factor $\beta_{block}^H$ represents a modulo level of a modulo operation performed in the transmitter.

7. A channel selection method in a multi-user Multiple-Input Multiple-Output (MIMO) system, the method comprising:
   receiving pilot signals through a plurality of antennas from a transmitter;
   selecting an antenna having a best channel quality among the antennas using the pilot signals by each of a plurality of receivers;
   sending feedback information comprising channel information on the selected antenna to the transmitter by each receiver;

receiving the feedback information from each of the plurality of receivers;
generating a channel matrix using the feedback information by the transmitter; and
transmitting data simultaneously to the plurality of receivers using the channel matrix,
wherein the channel matrix generation comprises generating the channel matrix comprising backward filter information $B_{block}^H$, forward filter information $F_{block}^H$, and a scaling factor $\beta_{block}^H$, the backward filter information $B_{block}^H$, the forward filter information $F_{block}^H$, and the scaling factor $\beta_{block}^H$ being calculated for the each receiver using the feedback information received from the each receiver, and
wherein $^H$ is a Hermitian operator.

8. The channel selection method of claim 7, further comprising sending the scaling factor to each receiver.

9. An apparatus of a receiver for extracting channel information in a multi-user Multiple-Input Multiple-Output (MIMO) system, the apparatus comprising:
a receive beamformer configured to, upon receipt of different signals through a plurality of antennas:
determine channel information indicating channel information using the received signals; and
send the channel information to a transmitter; and
a multiplier configured to, upon receipt of a scaling factor from the transmitter, multiply an input signal by the inverse of the scaling factor.

10. The apparatus of claim 9, wherein the scaling factor represents a modulo level of a modulo operation performed in the transmitter.

11. The apparatus of claim 9, wherein the channel information extracted from the signals is calculated by obtaining decomposed channel information by SVD (Singular Value Decomposition) and multiplying the decomposed channel information by a channel matrix.

12. The apparatus of claim 9, wherein the signals comprise pilot signals.

13. An apparatus of a transmitter for selecting a channel in a multi-user Multiple-Input Multiple-Output (MIMO) system, the apparatus comprising:
an extractor configured to, upon receipt of channel information from a plurality of receivers, extract filter information from the channel information;
a Tomlinson-Harashima Precoding (THP) part configured to control the power of data using the filter information; and
a beamforming part configured to control beamforming for a plurality of antennas using the filter information in order to simultaneously transmit the power-controlled data to the plurality of receivers.

14. The apparatus of claim 13, wherein the THP part comprises:
a permutation matrix portion configured to order an input signal;
a backward filter configured to filter the ordered signal; and
a modulo operator configured to control the power of the signal increased by the backward filter.

15. The apparatus of claim 13, wherein the channel information is calculated by obtaining decomposed channel information by SVD (Singular Value Decomposition) and multiplying the decomposed channel information by a channel matrix.

16. The apparatus of claim 13, wherein the filter information comprises backward filter information $B_{block}^H$, forward filter information $F_{block}^H$, and a scaling factor $\beta_{block}^H$,
wherein $^H$ is a Hermitian operator.

17. The apparatus of claim 16, wherein:
the backward filter information $B_{block}^H$ is unit lower triangular; and
the THP part is configured to control the power of the data using the backward filter information $B_{block}^H$.

18. The apparatus of claim 16, wherein the extractor is further configured to:
calculate the forward filter information $F_{block}^H$ by $F_{block}^H = \beta_{block}^H H_{eff}^H P_{block}^T L_{block}^{-H} D_{block}^{-1}$ in which $D_{block}$ is a diagonal matrix; and
calculate the scaling factor $\beta_{block}^H$ to satisfy a transmit power,
wherein H is a channel matrix.

19. The apparatus of claim 16, wherein the scaling factor $\beta_{block}^H$ represents a modulo level of a modulo operation performed in the transmitter.

20. A method of a transmitter for selecting a channel in a multi-user Multiple-Input Multiple-Output (MIMO) system, the method comprising:
extracting, upon receipt of channel information from a plurality of receivers, filter information from the channel information;
controlling the power of data using the filter information; and
controlling beamforming for a plurality of antennas using the filter information in order to simultaneously transmit the power-controlled data to the plurality of receivers.

21. The method of claim 20, wherein the channel information represents the channel state of an antenna among antennas of each of the receivers, comprising a Hermitian matrix $H_{eff}$ comprising channel information and a channel noise,
wherein H is a channel matrix.

22. The method of claim 20, wherein the filter information comprises backward filter information $B_{block}^H$, forward filter information $F_{block}^H$, and a scaling factor $\beta_{block}^H$,
wherein $^H$ is a Hermitian operator.

23. The method of claim 22, wherein:
the backward filter information $B_{block}^H$ is unit lower triangular; and
the power control comprises controlling the power of the data using the backward filter information $B_{block}^H$.

24. The method of claim 22, wherein the extraction comprises:
calculating the forward filter information $F_{block}^H$ by $F_{block}^H = \beta_{block}^H H_{eff}^H P_{block}^T L_{block}^{-H} D_{block}^{-1}$ in which $D_{block}$ is a diagonal matrix; and
calculating the scaling factor $\beta_{block}^H$ to satisfy a transmit power.

25. The method of claim 22, wherein the beamforming control comprises controlling the beamforming for the plurality of antennas using the forward filter information $F_{block}^H$.

26. A computer-readable recording medium storing a program for selecting a channel in a multi-user Multiple-Input Multiple-Output (MIMO) system, comprising:
a first set of instructions for receiving pilot signals through a plurality of antennas from a transmitter and selecting an antenna having a best channel quality among the antennas using the pilot signals by each of a plurality of receivers;
a second set of instructions for sending feedback information comprising channel information on the selected antenna to the transmitter by each receiver;
a third set of instructions for receiving the feedback information from each of the plurality of receivers and generating a channel matrix using the feedback information by the transmitter; and a fourth set of instructions for transmitting data simultaneously to the plurality of receivers using the channel matrix, wherein the channel matrix generation comprises generating the channel matrix comprising backward filter information $B_{block}^{H}$, forward filter information $F_{block}^{H}$, and a scaling factor $\beta_{block}^{H}$, the backward filter information $B_{block}^{H}$, the forward filter information $F_{block}^{H}$, and the scaling factor $\beta_{block}^{H}$ being calculated for the each receiver using the feedback information received from the each receiver, and where H is a matrix value.

27. A computer-readable recording medium storing a program for selecting a channel in a multi-user Multiple-Input Multiple-Output (MIMO) system, comprising:

a first set of instructions for extracting, upon receipt of channel information from a plurality of receivers, filter information from the channel information;

a second set of instructions for controlling the power of data using the filter information; and a third set of instructions for controlling beamforming for a plurality of antennas using the filter information in order to simultaneously transmit the power-controlled data to the plurality of receivers.

* * * * *